US011589706B2

(12) United States Patent
Bhavthankar et al.

(10) Patent No.: US 11,589,706 B2
(45) Date of Patent: Feb. 28, 2023

(54) DEPLOYABLE GRILL

(71) Applicant: WHIRLPOOL CORPORATION, Benton Harbor, MI (US)

(72) Inventors: Vinit Vijay Bhavthankar, Pune (IN); Nilesh Chhotu Jadhav, Pune (IN); Binesh Raj Pillai, Navi Mumbai (IN)

(73) Assignee: Whirlpool Corporation, Benton Harbor, MI (US)

( * ) Notice: Subject to any disclaimer, the term of this patent is extended or adjusted under 35 U.S.C. 154(b) by 843 days.

(21) Appl. No.: 16/405,028

(22) Filed: May 7, 2019

(65) Prior Publication Data
US 2020/0352392 A1   Nov. 12, 2020

(51) Int. Cl.
| | |
|---|---|
| *A47J 37/04* | (2006.01) |
| *A47J 37/06* | (2006.01) |
| *A47J 27/12* | (2006.01) |
| *F24C 15/18* | (2006.01) |

(52) U.S. Cl.
CPC ............... *A47J 37/04* (2013.01); *A47J 27/12* (2013.01); *A47J 37/06* (2013.01); *F24C 15/18* (2013.01)

(58) Field of Classification Search
CPC ...... A47J 44/00; A47J 37/1209; A47J 37/041; A47J 37/0623; A47J 37/0629; A47J 37/04; A47J 27/12; A47J 37/06; F24C 15/18

USPC ................ 99/339, 340, 422, 446, 447, 419
See application file for complete search history.

(56) References Cited

U.S. PATENT DOCUMENTS

| | | | |
|---|---|---|---|
| 2,668,527 A | 2/1954 | Chambers | |
| 3,008,406 A | 11/1961 | Reeves et al. | |
| 3,797,375 A | 3/1974 | Cerola | |
| 6,399,925 B1 | 6/2002 | Pickering et al. | |
| 6,903,309 B2 | 6/2005 | Rhinehart | |
| 9,936,837 B1 | 4/2018 | Granberry | |
| 2016/0029838 A1* | 2/2016 | Freymiller | ........... A47J 37/0611 99/376 |

FOREIGN PATENT DOCUMENTS

| | | |
|---|---|---|
| GB | 2445622 A | 7/2008 |
| WO | 03060383 A1 | 7/2003 |
| WO | 2017020951 A1 | 2/2017 |

* cited by examiner

*Primary Examiner* — Phuong T Nguyen
(74) *Attorney, Agent, or Firm* — Price Heneveld LLP (57) ABSTRACT

A deployable grill including a support frame having a support member operable between a stowed position and a deployed position. First and second brackets outwardly extend from the support member and are spaced-apart from one another to define a receiving area therebetween. A heating element is disposed on the support member adjacent to the receiving area. At least one spit rod is received in the receiving area.

20 Claims, 7 Drawing Sheets

DEPLOYABLE GRILL

FIELD OF DISCLOSURE

The present disclosure generally relates to a deployable grill, and more specifically, to a deployable grill for a cooktop.

BACKGROUND OF THE DISCLOSURE

Grilling devices often utilize a flat pan or flat grates for cooking food products. The food may be kept in certain positions, and often requires a user to move or flip the food product to evenly cook the food product. Other grilling devices allow for rotating the food product, but often require a user to manually rotate the food product and monitor the cooking process.

SUMMARY OF THE DISCLOSURE

According to one aspect of the present disclosure, a deployable grill including a support frame having a support member operable between a stowed position and a deployed position. First and second brackets outwardly extend from the support member and are spaced-apart from one another to define a receiving area therebetween. A heating element is disposed on the support member adjacent to the receiving area. At least one spit rod is received in the receiving area.

According to another aspect of the present disclosure, a deployable grill includes a support member operable between a stowed position and a deployed position. A drive system is disposed on the support member for movement therewith. At least one spit rod has first and second ends and a body portion disposed therebetween, wherein the at least one spit rod is operably coupled to the drive system for rotating the at least one spit rod. A heating element is disposed on the support member, wherein the body portion of the at least one spit rod is disposed adjacent to the heating element.

According to yet another aspect of the present disclosure, a cooktop includes a support frame. A support member is coupled to the support frame and is operable between first and second positions with respect to the support frame. At least one spit rod is operably coupled to a receiving area of the support member. A heating element is disposed on the support member. A hinge assembly is coupled between the support member and the support frame, wherein the hinge assembly rotatably couples the support member to the support frame.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a deployable grill. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
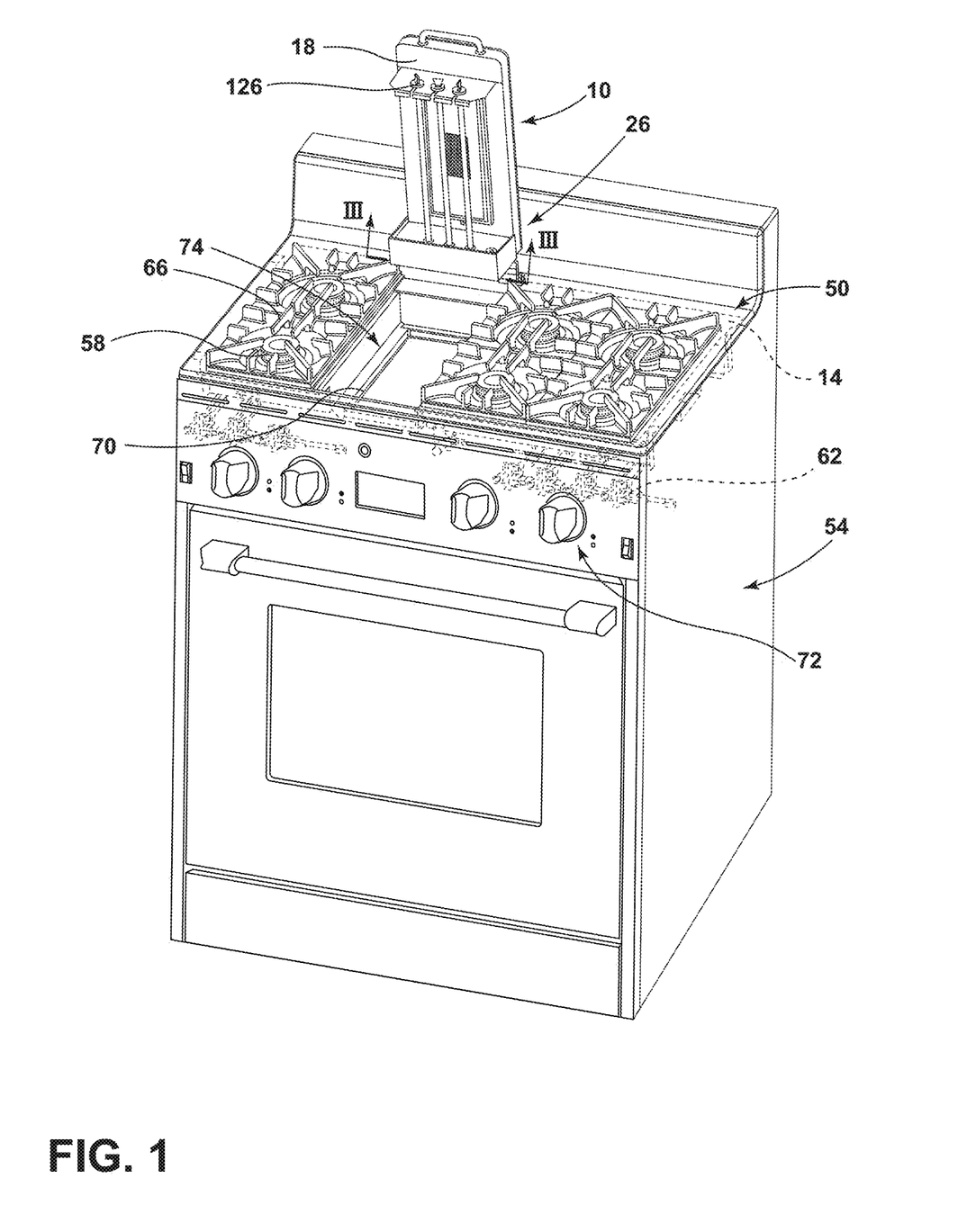
FIG. 1 is a front perspective view of a cooking appliance having a deployable grill, according to at least one example.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-6, reference numeral 10 generally designates a deployable grill including a support frame 14 having a support member 18 operable between a stowed position 22 and a deployed position 26. First and second brackets 30, 34 outwardly extend from the support member 18 and are spaced-apart from one another to define a receiving area 38 therebetween. A heating element 42 is disposed on the support member 18 adjacent to the receiving area 38. At least one spit rod 46 is received in the receiving area 38.

Referring to FIG. 1, the deployable grill 10 is illustrated as part of a cooktop 50 of a cooking appliance 54, and is shown in the deployed position 26. In various examples, the deployable grill 18 may be integrated into the cooktop. It is contemplated that the deployable grill 10 may not be part of a cooktop 50 or a cooking appliance 54. Further, it is contemplated that the deployable grill 10 and/or the cooktop 50 may be disposed on a countertop. It is also contemplated that the deployable grill 10 may be a stand-alone appliance. The support frame 14 is positioned about at least a portion of a perimeter of the cooktop 50. The support frame 14 includes and/or is coupled to the support member 18 of the deployable grill 10. The cooktop 50 may include at least one burner 58. As illustrated in the embodiment of FIG. 1, the deployable grill 10 is disposed between burners 58. Accordingly, burners 58 are positioned on opposing sides of the deployable grill 10. However, it is contemplated that the cooktop 50 may not include burners 58, or that the burners 58 may be positioned on a single side of the deployable grill 10.

The cooktop 50 illustrated in FIG. 1 is a gas-powered cooktop. Accordingly, the cooking appliance 54 includes burner pipes 62 for supplying a gas heat source to the burners 58. The burner pipes 62 are disposed under the cooktop 50, and may be disposed on the cooking appliance 54. It is also contemplated that the cooktop 50 may be an electric-powered cooktop without departing from the teachings herein. Additionally or alternatively, the cooktop 50 includes grates 66 positioned about each burner 58. The cooktop 50 may also include a drip pan 70 disposed within a cavity 74. The drip pan 70 may collect grease or food as food product is cooked on the deployable grill 10. Further, the cooktop 50 includes a control 72 for controlling operation of the cooktop 50 and/or the cooking appliance 54. The control 72 may be disposed adjacent to the cooktop 50, or may be disposed elsewhere on the cooktop 50 and/or cooking appliance 54.

Figure 2:
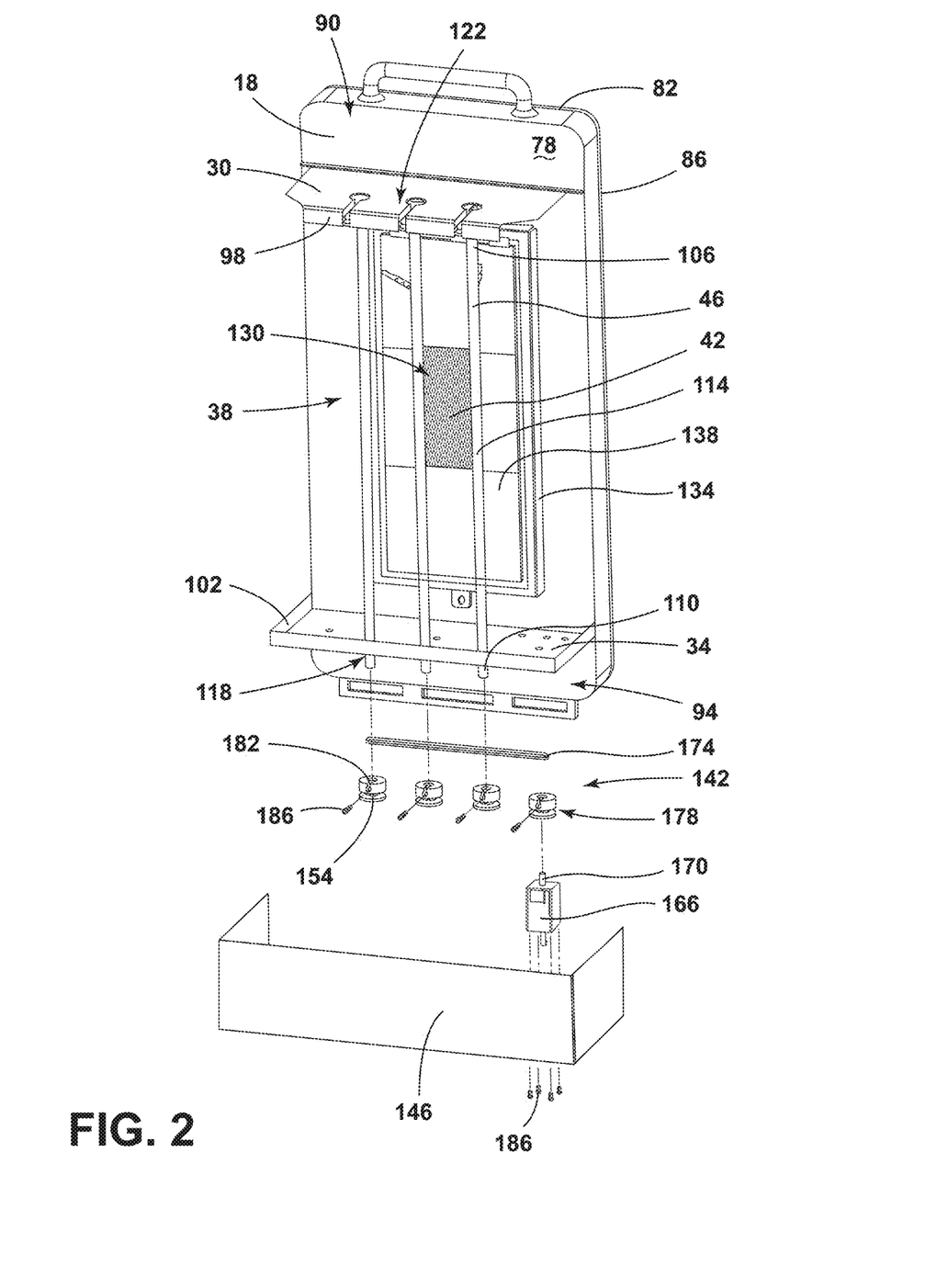
FIG. 2 is an exploded view of the deployable grill, according to at least one example.
Figure 4:
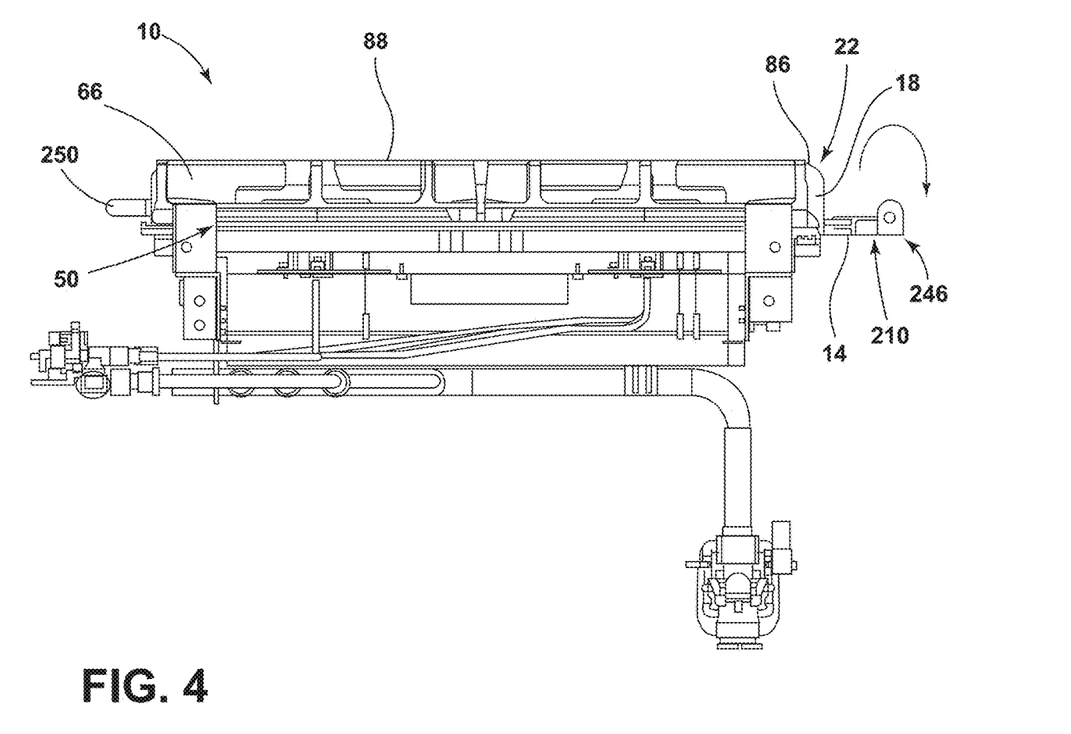
FIG. 4 is a side view of the deployable grill in a stowed position, according to at least one example.

Referring to FIGS. 1 and 2, the deployable grill 10 includes the support member 18. The support member 18 is operable between first and second positions relative to the support frame 14. In various examples, the first and second positions may be the deployed position 26 and the stowed position 22 (FIG. 4). The support member 18 includes an inner surface 78 and an outer surface 82. The outer surface 82 may include a cover 86. The cover 86 may dissipate heat from the deployable grill 10. Additionally or alternatively, the cover 86 may include a non-conductive material to reduce heat transfer.

In various examples, the first and second brackets 30, 34 outwardly extend from the inner surface 78 of the support member 18. The first and second brackets 30, 34 are spaced-apart from one another to define the receiving area 38 therebetween. When the support member 18 is in the deployed position 26, the first and second brackets 30, 34 may define a vertically-oriented receiving area 38. In such examples, the receiving area 38 extends longitudinally relative to the support member 18. It is contemplated that the receiving area 38 may be horizontally-oriented, such that the receiving area 38 extends laterally relative to the support member 18. Additionally or alternatively, at least one of the first and second brackets 30, 34 may include a curved edge 98. The first and second brackets 30, 34 are disposed proximate to first and second end portions 90, 94 of the support member 18, respectively. In the embodiment illustrated in FIG. 2, the first bracket 30 is disposed on the first end portion 90 of the support member 18 above the heating element 42, and the second bracket 34 is disposed on the second end portion 94 of the support member 18 below the heating element 42. In such examples, the second bracket 34 includes a rim 102 disposed around a perimeter of the second bracket 34. The rim 102 may be advantageous to collect grease and other drippings from food product disposed on the spit rod 46.

Referring still to FIGS. 1 and 2, the spit rod 46 is operably coupled to the receiving area 38 of the support member 18. The spit rod 46 includes a first end 106, a second end 110, and a body portion 114 disposed therebetween. The first and second ends 106, 110 of the spit rod 46 are removably coupled to the first and second brackets 30, 34, respectively, for rotation thereon. Accordingly, in the embodiment illustrated in FIGS. 1 and 2, the spit rod 46 extends between the first and second brackets 30, 34. The deployable grill 10 includes at least one spit rod 46. As illustrated, the at least one spit rod 46 includes a plurality of spit rods 46 spaced-apart from one another as received in the receiving area 38. Each spit rod 46 of the plurality of spit rods 46 includes first and second ends 106, 110 removably coupled to the first and second brackets 30, 34, respectively, for rotation thereon. In various examples, the spit rods 46 may extend through the first and second brackets 30, 34. At least one of the first and second brackets 30, 34 define slots 122 for receiving the spit rods 46. The other of the first and second brackets 30, 34 define apertures 118 for receiving the spit rods 46. In the embodiment illustrated in FIGS. 1 and 2, the first bracket 30 defines the slots 122 and the second bracket 34 defines the apertures 118. In such examples, the deployable grill 10 includes retaining members 126 for retaining the spit rods 46 within the slots 122 of the first bracket 30. The retaining members 126 may retain the spit rods 46 while allowing rotation. The retaining members 126 may rotate with the spit rods 46. Additionally or alternatively, the retaining members 126 may remain substantially stationary while the spit rods 46 rotate.

Referring to FIG. 2, the heating element 42 is disposed on the inner surface 78 of the support member 18. The heating element 42, as illustrated, is disposed between the first and second brackets 30, 34. The heating element 42 may be an electric-powered heating element. In such examples, the heating element 42 may include coils or tubes configured to radiate heat. The heating element 42, illustrated in the embodiment of FIG. 2, is disposed in a central portion 130 of the support member 18. The heating element 42 may include a heating element frame 134. The heating element frame 134 may be configured to couple the heating element 42 to the inner surface 78 of the support member 18. The heating element frame 134 may operate to minimize the heat transferred to the support member 18 from the heating element 42. A heating portion 138 may be disposed between the heating element 42 and the heating element frame 134. The heating portion 138 may include conductive materials to generate heat in addition to the heating element 42. The heating portion 138 may operate to increase the area configured to generate heat for cooking food products. It is contemplated that the deployable grill 10 may not include the heating portion 138. In such examples, the heating element frame 134 may be disposed adjacent to the heating element. Additionally or alternatively, the heating element 42 may be larger to include the heating portion 138 area.

The heating element 42, as illustrated in the embodiment of FIG. 2, is disposed on the support member 18 adjacent to the receiving area 38. The spit rods 46 are received within the receiving area 38 and disposed adjacent to the heating element 42. In various examples, the body portions 114 of the spit rods 46 are disposed adjacent to the heating element 42 for cooking a food product disposed on at least one of the spit rods 46. The heating element 42 is configured to radiate heat toward the receiving area 38. In various examples, the heat generated from the heating element 42 may be adjustable.

Figure 3A:
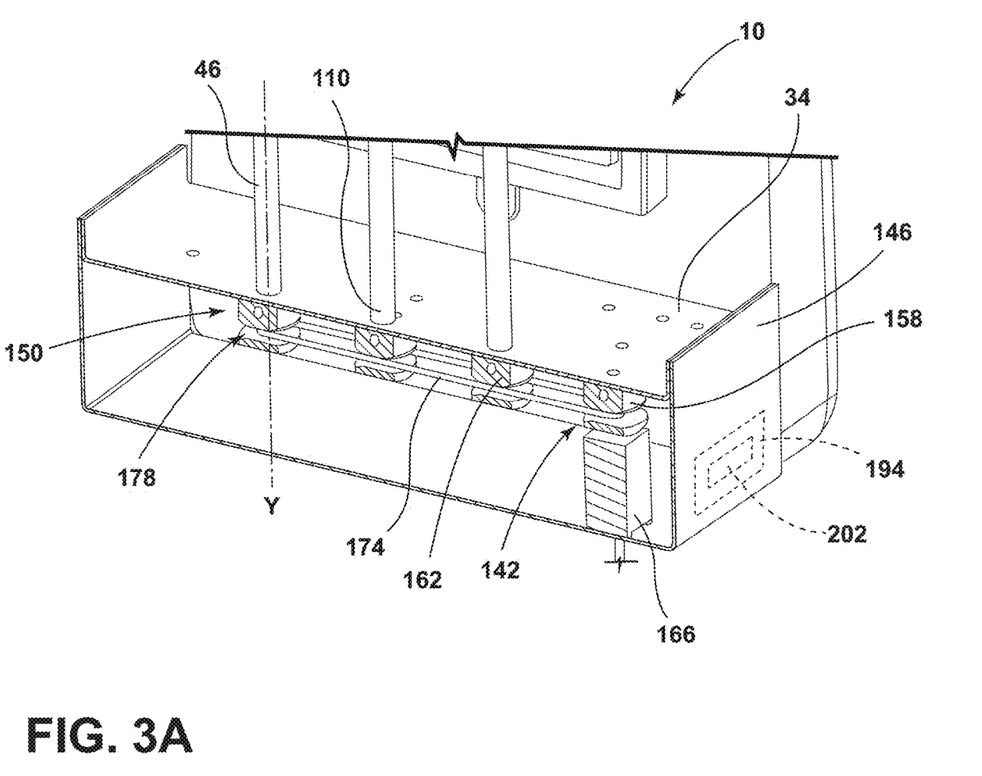
FIG. 3A is a cross-sectional view taken along line III-III of FIG. 1 of a portion of the deployable grill including a drive system, according to at least one example.

Referring to FIGS. 2 and 3A, the deployable grill 10 includes a drive system 142 operably coupled to the support member 18 and the spit rods 46. The drive system 142 may be disposed on the support member 18 for movement therewith. In various examples, the drive system 142 operates to rotate the spit rods 46. In other words, the spit rods 46 are operably coupled to the drive system 142 for rotating the spit rods 46 relative to the support member 18. The drive system 142 may be disposed within a housing 146 at least partially defined by one of the first and second brackets 30, 34. As illustrated in FIG. 2, the drive system 142 is disposed proximate to the second bracket 34. However, the drive system 142, and the housing 146 for the drive system 142, may be disposed adjacent to the first bracket 30 without departing from the teachings herein. In various examples, the one of the first and second brackets 30, 34 that at least partially defines the housing 146 defines the apertures 118 for receiving the spit rods 46, and the other of the first and second brackets 30, 34 defines the slots 122. The one of the first and second brackets 30, 34 having the apertures 118 being disposed in proximity to the drive system 142 may increase stability of the spit rods 46 as the spit rods 46 rotate. Additionally or alternatively, the drive system 142 may be configured to rotate each of the spit rods 46 around its own vertical axis y. However, other methods of rotating the spit rods 46 may be used without departing from the teachings herein.

In the embodiment illustrated in FIGS. 2 and 3A, the drive system 142 includes a pulley system 150. In such examples, the drive system 142 includes at least one pulley 154, and may include a plurality of pulleys 154. Accordingly, the pulley system 150 may be coupled to the spit rods 46 and configured to rotate the spit rods 46. The plurality of pulleys 154, illustrated in FIG. 3A, includes a drive pulley 158 and at least one follower pulley 162. The plurality of pulleys 154 correlate to the plurality of spit rods 46. In other words, each of the pulleys 154 of the plurality of pulleys 154 corresponds with an associated spit rod 46 of the plurality of spit rods 46. Similarly, each spit rod 46 corresponds to the associated pulley 154 of the plurality of pulleys 154. As illustrated, each of the follower pulleys 162 is coupled to the associated spit rod 46, however, it is contemplated that the drive pulley 158 may also be coupled to a spit rod 46. The pulleys 154 are operably coupled to one of the first and second ends 106, 110 of the spit rods 46, respectively, for driving rotation.

Referring still to FIGS. 2 and 3A, the drive pulley 158 is coupled to a motor 166. The motor 166 includes a drive gear 170 to engage the drive pulley 158. The motor 166 may be, for example, a stepper motor or a solenoid motor. However, the drive system 142 may include other types of motors 166, without departing from the teachings herein. In various examples, the drive pulley 158 is coupled to the follower pulleys 162 via a drive belt 174. The pulleys 154 each define a v-shaped indent 178 for retaining the drive belt 174. The drive belt 174 may be configured to rotate each of the follower pulleys 162 in time with the rotation of the drive pulley 158. In other words, the follower pulleys 162 are driven by the drive belt 174. Accordingly, the pulleys 154 rotate the associated spit rods 46 at a substantially similar speed. Additionally or alternatively, the speed of rotation of the pulleys 154 and/or the spit rods 46 may be adjustable. The drive system 142 may be configured to continually rotate the spit rods 46 at a predetermined speed. Additionally or alternatively, the drive system 142 may be configured to pause the rotation of one or more spit rods 46. In such examples, the rotation of some spit rods 46 may be paused while other spit rods 46 continue to rotate.

It is also contemplated that different variations for the drive system 142 may be used without departing from the teachings herein. For example, each spit rod 46 may be configured to be independently operable. In such examples, the drive system 142 may include a plurality of motors 166 to correspond to the spit rods 46. In other words, each spit rod 46 may be coupled to a motor 166. The speed of all the spit rods 46 and/or some of the spit rods 46 may be adjustable. Accordingly, each spit rod 46 may be operated at a different speed of rotation. Additionally or alternatively, the drive system 142 may include more than one drive pulley 158. In such examples, the spit rods 46 may operate in groupings. In other words, some spit rods 46 may be coupled to at least one drive pulley 158 and other spit rods 46 may be coupled to another drive pulley 158. This may allow different groupings of spit rods to operate independently and/or at different speeds of rotation.

Referring still to FIGS. 2 and 3A, each spit rod 46 is disposed within openings 182 defined by the associated pulleys 154, respectively. The pulleys 154 may be fastened or otherwise coupled to the spit rods 46. For example, the pulleys 154 may each be coupled to the corresponding spit rod 46 via a fastener 186, such as for example, a pin, a screw, or a bolt. Additionally or alternatively, each pulley 154 includes the opening 182 having an angled cross-section. In such examples, the second end 110 of each spit rod 46 engages with the angled opening 182 and is configured for rotation. The second ends 110 of the spit rods 46 are configured to slide into the openings 182 of the pulleys 154, respectively, and engage the pulleys 154 for rotation. Accordingly, each pulley 154 and corresponding spit rod 46 are configured to rotate together. The drive pulley 158 may be coupled to the second bracket 34. Alternatively, the drive pulley 158 may be supported by the drive gear 170 coupled to the motor 166. The drive gear 170 may extend into the opening 182 defined by the drive pulley 158. When assembled, the motor 166 is engaged with the drive pulley 158, which is operably coupled to the follower pulleys 162 via the drive belt 174. The drive belt 174 extends through the v-shaped indents 178 of each of the pulleys 154. In such examples, the activation of the motor 166 provides for rotation of the pulleys 154 and, therefore, rotation of the spit rods 46. The motor 166, as illustrated, is coupled to the housing 146 via the fasteners 186, however, it is contemplated that the motor 166 may otherwise be coupled or fastened to the housing 146. As illustrated in the embodiment of FIG. 3, the drive system 142 is disposed within the housing 146, which is at least partially defined by the second bracket 34. The housing 146 and drive system 142 are disposed proximate to the second end portion 94 of the support member 18 and the drive system 142 is coupled to the second ends 110 of the spit rods 46. However, it is also contemplated that the drive system 142 may be coupled to the first ends 106 of the spit rods 46. In such examples, the drive system 142 may be disposed proximate to the first end portion 90 of the support member 18 and the housing 146 may be at least partially defined by the first bracket 30.

Referring to FIG. 3A, in various examples, the deployable grill 10 includes a controller 194. The controller 194 may include a processor, other control circuitry, and a memory. Stored in the memory and executable by the processor are various instructions. The controller 194 may also include a timer 202. The controller 194 may be operably coupled to the motor 166. Additionally or alternatively, the deployable grill 10 may have preset cooking times based on food category and/or rotation speed of the spit rods 46. In such examples, a user may set the timer 202 and/or select a preset cooking time within the timer 202. The controller 194 may then control the drive system 142 to operate the drive system 142 for the selected and/or preset time. Upon completion of the selected and/or preset time, the controller 194 may operate to stop the drive system 142. Further, the controller 194 may be operably coupled to the heating element 42. The controller 194 may control the heating element 42 based on the selected and/or preset time. Accordingly, the controller 194 may activate the heating element 42 and deactivate the heating element 42 after the selected and/or preset time ends. The controller 194 may be disposed on the deployable grill 10. Alternatively, the controller 194 may be disposed elsewhere on the cooktop 50 and/or cooking appliance 54, such as, for example, proximate the control 72 (FIG. 1).

Figure 3B:
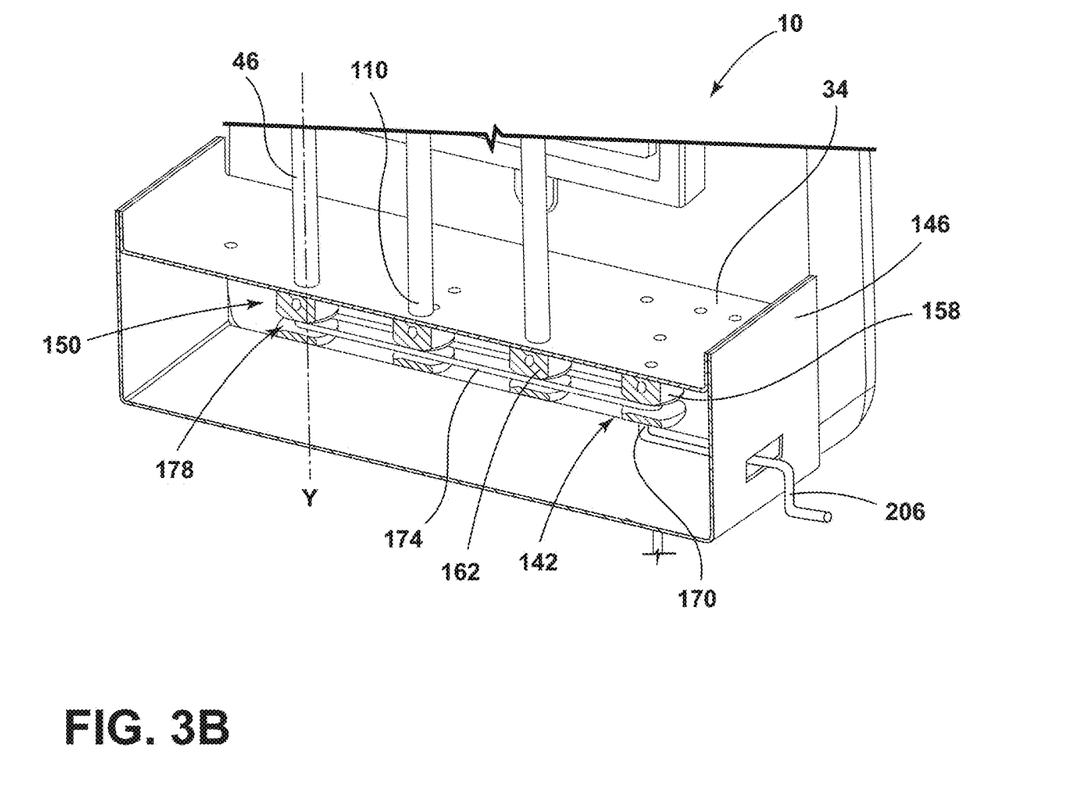
FIG. 3B is a cross-sectional view taken along line III-III of FIG. 1 of a portion of the deployable grill including the drive system, according to at least one example.

Referring to FIG. 3B, in various examples, the drive system 142 includes a drive handle 206. The drive handle 206 is operably coupled to the drive pulley 158 and/or at least one of the follower pulleys 162. The drive handle 206 may allow a user to manually rotate the spit rods 46. The drive handle 206 may be advantageous for rotating the spit rods 46 without using electricity. The drive handle 206 includes the drive gear 170 to engage the drive pulley 158. A user may rotate the drive handle 206 to rotate the drive pulley 158. The rotation of the drive pulley 158 operates to rotate the follower pulleys 162 via the drive belt 174. In various examples, the motor 166 (FIG. 2) and the drive handle 206 may be interchangeable, such that the drive system 142 may include either the motor 166, the drive handle 206, or a combination thereof.

Figure 5:
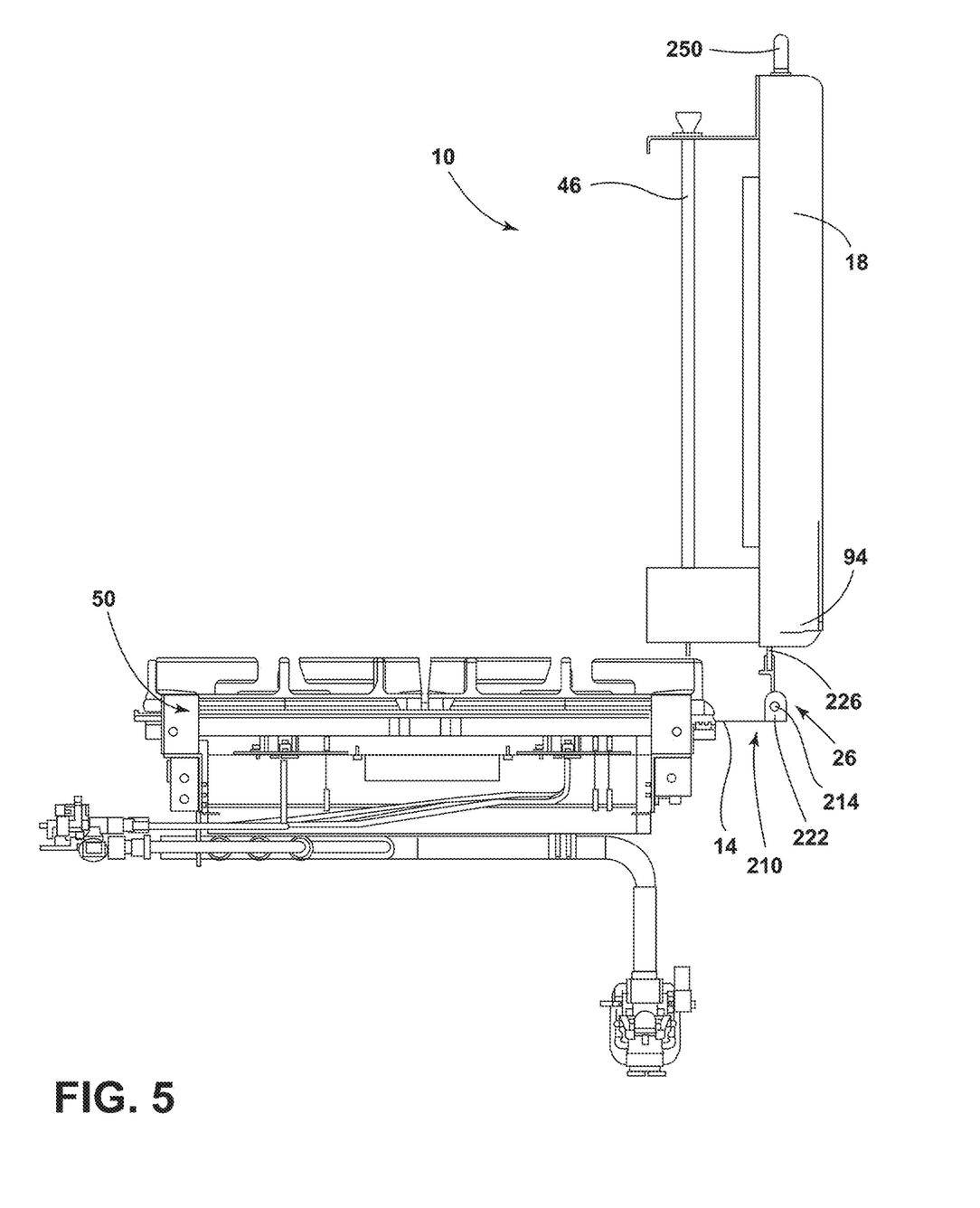
FIG. 5 is a side view of the deployable grill in a deployed position, according to at least one example.

Referring to FIGS. 1, 4, and 5 the cooktop 50 may be a substantially planar cooktop 50. As illustrated in FIG. 1, the cooktop 50 defines the cavity 74 adjacent to the support member 18 of the deployable grill 10. When in the stowed position 22, the cavity 74 accommodates the deployable grill 10. In other words, at least a portion of the deployable grill 10 is disposed within the cavity 74 when the deployable grill 10 is in the stowed position 22. For example, the spit rods 46 may be disposed within the cavity 74, when the support member 18 is in the stowed position 22. In various examples, when in the stowed position 22, the cover 86 of the deployable grill 10 is on a same or parallel plane as the grates 66. Additionally or alternatively, an outer surface 88 of the cover 86 may be flush with the grates 66 in a substantially horizontal position when the deployable grill 10 is in the stowed position 22. The stowed position 22 is substantially horizontal and the deployed position 26 is upright. In various examples, when in the deployed position 26, the support member 18 extends at an angle in a range of about 45° to about 135° relative to the cooktop 50. However, the support member 18 may extend at other angles without departing from the teachings herein.

Figure 6:
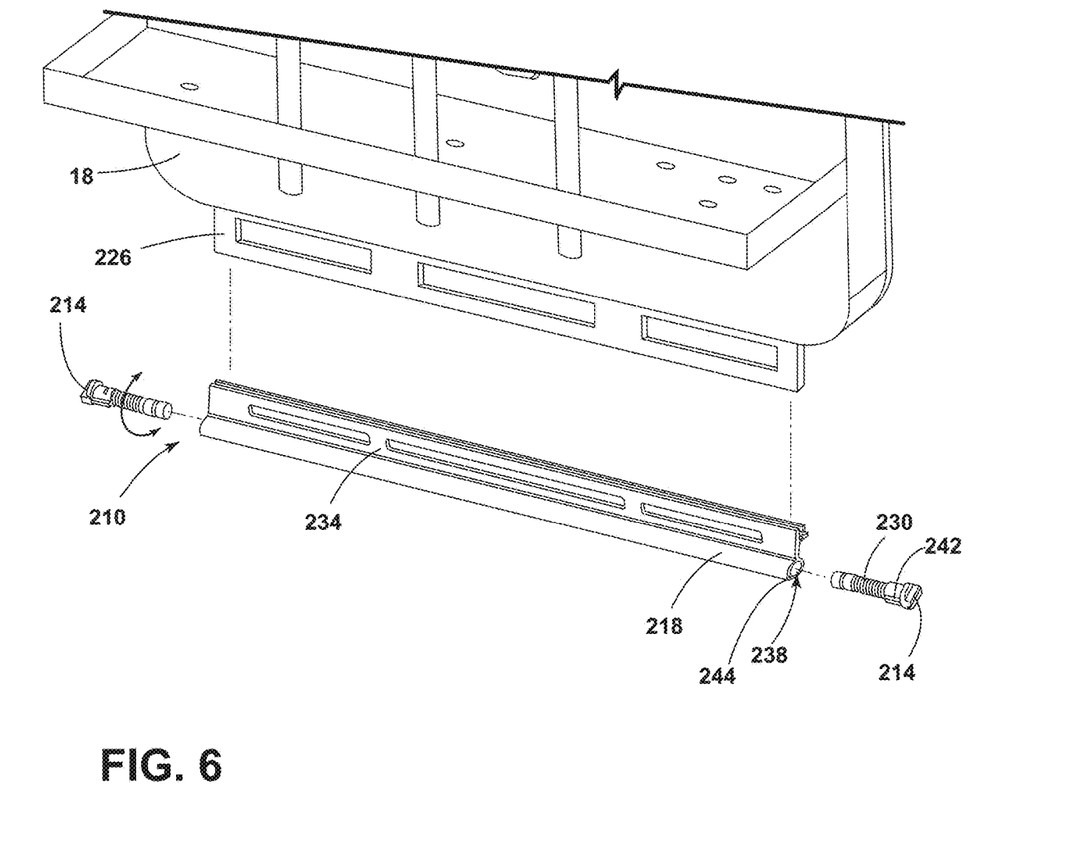
FIG. 6 is an exploded view of a portion of the deployable grill including a hinge assembly, according to at least one example.

Referring to FIGS. 4-6, the support member 18 of the deployable grill 10 is operable between the stowed position 22, as shown in FIG. 4, and the deployed position, as shown in FIG. 5. A hinge assembly 210 is coupled between the support member 18 and the support frame 14. In other words, the hinge assembly 210 rotatably couples the support member 18 to the support frame 14. As illustrated, the hinge assembly 210 is disposed on the second end portion 94 of the support member 18. The hinge assembly 210 includes first and second hinge members 214, 218 pivotally coupled to one another. The first hinge member 214 is coupled to the support frame 14. The support frame 14 defines tabs 222 extending vertically and coupling to the first hinge member 214. The second hinge member 218 is coupled to the support member 18. The second end portion 94 of the support member 18 includes a flange 226 extending therefrom and configured to couple with the second hinge member 218. It is also contemplated that the second hinge member 218 may be coupled to the support frame 14 and the first hinge member 214 may be coupled to the support member 18. The hinge assembly 210 is illustrated in FIG. 6 including left and right first hinge members 214 pivotally coupled to left and right sides of the second hinge member 218. However, it is contemplated that the hinge assembly 210 includes the first hinge member 214 pivotally coupled to one of the left and right sides of the second hinge member 218. As illustrated in the embodiment in FIG. 6, the hinge assembly 210 includes a biasing mechanism 230 operably coupled to the first and second hinge members 214, 218. The biasing mechanism 230 may be configured to bias the support member 18 towards the deployed position 26. It may be advantageous for the biasing mechanism 230 to bias the support member 18 to the deployed position 26 to allow for easier movement to the deployed position 26. However, it is also contemplated that the biasing mechanism 230 biases the support member 18 to the stowed position 22.

Referring still to FIGS. 4-6, at least one of the first and second hinge members 214, 218 is an elongated hinge member that corresponds to a width of the flange 226 of the support member 18. The flange 226 extends outwardly from the second end portion 94 of the support member 18. As illustrated in the embodiment of FIG. 6, the second hinge member 218 is the elongated hinge member. In such examples, the second hinge member 218 includes an attachment element 234 for coupling the second hinge member 218 to the flange 226 of the support member 18. At least a portion of the first hinge member 214 may be disposed on the second hinge member 218. Additionally or alternatively, the second hinge member 218 may define a channel 238 and the first hinge member 214 may be disposed at least partially within the channel 238. In such examples, the first hinge member 214 may define a projection 242 configured to cooperate with a notch 244 defined by the second hinge member 218. The projection 242 and notch 244 cooperate to define the range of motion of the support member 18. Accordingly, when the outer edges of the notch 244 contact the projection 242, the support member 18 may be prevented from moving further in the respective direction. In other words, the outer edges of the notch 244 may define the stowed position 22 and the deployed position 26. As illustrated in FIGS. 4 and 5, the hinge assembly 210 is coupled to a rear portion 246 of the support frame 14. Accordingly, the support member 18 may rotate about the rear portion 246 of the support frame 14. However, it is also contemplated that the hinge assembly 210 may coupled to a lateral portion of the support member 18 without departing from the teachings herein. In such examples, the support member 18 may rotate about a portion of the cooktop 50 adjacent to the deployable grill 10.

In various examples, the deployable grill 10 includes a grasp handle 250. The grasp handle 250 is coupled to the first end portion 90 of the support member 18 opposing the hinge assembly 210. The grasp handle 250 assists a user in moving the deployable grill 10 between the stowed and deployed positions 22, 26.

Referring to FIGS. 1-6, the deployable grill 10 may be operational and/or functional in the deployed position 26, the stowed position 22, and positions therebetween. In other words, the heating element 42 is configured to radiate heat toward the receiving area 38 when the support member 18 is disposed in both the stowed and deployed positions 22, 26. Accordingly, the deployable grill 10 may be configured to cook food product when in both the stowed and deployed positions 22, 26. Additionally or alternatively, a user may move the deployable grill 10 between the stowed and deployed positions 22, 26 while the heating element 42 is radiating heat toward the spit rods 46.

Use of the present disclosure may provide a variety of advantages. First, the deployable grill 10 may operate in both the stowed position 22 and the deployed position 26. Second, the drive system 142 may allow food product to be cooked evenly with less human attention to the cooking process. Third, the drive system 142 may minimize the manual monitoring of the cooking process.

According to at least one aspect of the present disclosure, a deployable grill including a support frame having a support member operable between a stowed position and a deployed position. First and second brackets outwardly extend from the support member and are spaced-apart from one another to define a receiving area therebetween. A heating element is disposed on the support member adjacent to the receiving area. At least one spit rod is received in the receiving area.

According to another aspect of the present disclosure, the at least one spit rod has first and second ends and a body portion disposed therebetween.

According to another aspect of the present disclosure, the first and second ends of the at least one spit rod are removably coupled to the first and second brackets, respectively, for rotation thereon.

According to still another aspect of the present disclosure, a pulley system is coupled to the at least one spit rod, wherein the pulley system operates to rotate the at least one spit rod.

According to yet another aspect of the present disclosure, the pulley system is disposed within a housing at least partially defined by one of the first and second brackets.

According to another aspect of the present disclosure, the at least one spit rod includes a plurality of spit rods spaced-apart from one another as received in the receiving area, wherein each spit rod of the plurality of spit rods includes first and second ends removably coupled to the first and second brackets, respectively, for rotation thereon.

According to another aspect of the present disclosure, a pulley system includes a plurality of pulleys, wherein the plurality of pulleys correlates to the plurality of spit rods, and further wherein each pulley of the plurality of pulleys is operably coupled to an associated spit rod of the plurality of spit rods.

According to another aspect of the present disclosure, a deployable grill including a support member operable between a stowed position and a deployed position. A drive system is disposed on the support member for movement therewith. At least one spit rod has first and second ends and a body portion disposed therebetween, wherein the at least one spit rod is operably coupled to the drive system for rotating the at least one spit rod. A heating element is disposed on the support member, wherein the body portion of the at least one spit rod is disposed adjacent to the heating element.

According to another aspect of the present disclosure, first and second brackets extend outwardly from the support member, wherein the first and second ends of the at least one spit rod are removably coupled to the first and second brackets, respectively, for rotation thereon.

According to another aspect of the present disclosure, the at least one spit rod includes a plurality of spit rods.

According to another aspect of the present disclosure, the drive system includes a plurality of pulleys, and the plurality of pulleys correlates to the plurality of spit rods.

According to another aspect of the present disclosure, the drive system further includes a motor, and further plurality of pulleys includes a drive pulley operably coupled to the motor and at least one follower pulley.

According to still another aspect of the present disclosure, the support stowed position is substantially horizontal and the deployed position is upright.

According to yet another aspect of the present disclosure, a hinge assembly is disposed on an end portion of the support member, and the hinge assembly includes first and second hinge members pivotally coupled to one another.

According to another aspect of the present disclosure, the hinge assembly further includes a biasing mechanism configured to bias the support member towards the deployed position.

According to yet another aspect of the present disclosure, a cooktop includes a support frame. A support member is coupled to the support frame and is operable between first and second positions with respect to the support frame. At least one spit rod is operably coupled to a receiving area of the support member. A heating element is disposed on the support member. A hinge assembly is coupled between the support member and the support frame, and the hinge assembly rotatably couples the support member to the support frame.

According to another aspect of the present disclosure, the hinge assembly includes a first hinge member coupled to the support frame and a second hinge member coupled to the support member, and the first and second hinge members are pivotally coupled to one another.

According to still another aspect of the present disclosure, the hinge assembly further includes a biasing mechanism configured to bias the support member towards a deployed position.

According to another aspect of the resent disclosure, a drive system operably coupled to the support member and the at least on spit rod coupled rotates the at least one spit rod relative to the support member.

According to still another aspect of the present disclosure, the heating element is configured to radiate heat toward the receiving area when the support member is disposed in both the first and second positions.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A deployable grill, comprising:
   a support member operable between a stowed position and a deployed position;
   a drive system disposed on the support member for movement therewith, wherein the drive system includes a plurality of pulleys;
   a plurality of spit rods each having first and second ends and a body portion disposed therebetween, wherein the plurality of spit rods is operably coupled to the drive system for rotating the plurality of spit rods, and further wherein the plurality of pulleys correlates to the plurality of spit rods; and
   a heating element disposed on the support member, wherein the body portion of the at least one spit rod is disposed adjacent to the heating element.

2. The deployable grill of claim 1, including:
   first and second brackets extending outwardly from the support member, wherein the first and second ends of the at least one spit rod are removably coupled to the first and second brackets, respectively, for rotation thereon.

3. The deployable grill of claim 1, wherein the drive system further includes a motor, and further wherein the plurality of pulleys includes a drive pulley operably coupled to the motor and at least one follower pulley.

4. The deployable grill of claim 1, wherein the stowed position is substantially horizontal and the deployed position is upright.

5. The deployable grill of claim 1, including:
   a hinge assembly disposed on an end portion of the support member, wherein the hinge assembly includes first and second hinge members pivotally coupled to one another.

6. The deployable grill of claim 5, wherein the hinge assembly further includes a biasing mechanism configured to bias the support member towards the deployed position.

7. The deployable grill of claim 1, including:
   brackets coupled to the support member, and wherein the plurality of spit rods are removably coupled to the brackets for rotation thereon.

8. The deployable grill of claim 7, wherein a receiving area is defined between the brackets, and wherein the heating element is disposed adjacent the receiving area.

9. The deployable grill of claim 1, including:
   a bracket coupled to the support member and partially defining a housing, wherein the drive system is disposed within the housing.

10. The deployable grill of claim 1, wherein the drive system includes a drive handle.

11. A deployable grill, comprising:
    a support member operable between a stowed position and a deployed position;
    a drive system disposed on the support member for movement therewith;
    at least one spit rod having first and second ends and a body portion disposed therebetween, wherein the at least one spit rod is operably coupled to the drive system for rotating the at least one spit rod;
    a heating element disposed on the support member, wherein the body portion of the at least one spit rod is disposed adjacent to the heating element; and
    a hinge assembly disposed on an end portion of the support member, wherein the hinge assembly includes first and second hinge members pivotally coupled to one another, and further wherein the hinge assembly includes a biasing mechanism configured to bias the support member towards the deployed position.

12. The deployable grill of claim 11, wherein the drive system includes at least one pulley that correlates to the at least one spit rod.

13. The deployable grill of claim 12, wherein the drive system further includes a motor operably coupled to the at least one pulley.

14. The deployable grill of claim 11, wherein the second hinge member defines a channel to receive the flange.

15. The deployable grill of claim 14, wherein the support member includes a flange extending therefrom and configured to couple with the second hinge member.

16. The deployable grill of claim 11, wherein the first hinge member defines a projection configured to cooperate with a notch defined by the second hinge member to define a range of motion of the support member.

17. The deployable grill of claim 11, wherein the heating element is configured to radiate heat when the support member is disposed in the deployed position and the stowed position.

18. The deployable grill of claim 11, including:
    brackets coupled to the support member, wherein a receiving area is defined between the brackets, and wherein the heating element is disposed adjacent the receiving area.

19. The deployable grill of claim 11, including:
    a controller operably coupled to a motor of the drive system, and wherein the controller is configured operate the drive system for a predefined period of time in response to at least one of a user input in a timer and a preset cooking time.

20. The deployable grill of claim 11, wherein the drive system includes at least one follower pulley coupled to the at least one spit rod and a drive pulley coupled to a motor, and further wherein the drive pulley is operably coupled to the at least one follower pulley via a drive belt.

* * * * *